(12) United States Patent
Salvi et al.

(10) Patent No.: US 10,116,916 B2
(45) Date of Patent: Oct. 30, 2018

(54) METHOD FOR DATA REUSE AND APPLICATIONS TO SPATIO-TEMPORAL SUPERSAMPLING AND DE-NOISING

(71) Applicant: NVIDIA Corporation, Santa Clara, CA (US)

(72) Inventors: Marco Salvi, Kirkland, WA (US); Anjul Patney, Kirkland, WA (US); Aaron Eliot Lefohn, Kirkland, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 28 days.

(21) Appl. No.: 15/452,651

(22) Filed: Mar. 7, 2017

(65) Prior Publication Data

US 2017/0272722 A1 Sep. 21, 2017

Related U.S. Application Data

(60) Provisional application No. 62/309,922, filed on Mar. 17, 2016.

(51) Int. Cl.
*G06T 1/60* (2006.01)
*G06T 11/00* (2006.01)
(Continued)

(52) U.S. Cl.
CPC ............ *H04N 13/122* (2018.05); *G06T 1/60* (2013.01); *G06T 11/40* (2013.01); *H04N 13/106* (2018.05);
(Continued)

(58) Field of Classification Search
None
See application file for complete search history.

(56) References Cited

U.S. PATENT DOCUMENTS

| | | | | |
|---|---|---|---|---|
| 2011/0074925 A1* | 3/2011 | Turner | ................. | H04N 13/261 348/46 |
| 2014/0354675 A1* | 12/2014 | Lottes | ..................... | G06T 5/002 345/591 |
| 2015/0317827 A1* | 11/2015 | Crassin | ..................... | G06T 1/60 345/426 |

OTHER PUBLICATIONS

Proceedings of SPIE SPIEDigitalLibrary.org/conference-proceedings-of-spie A Distributed Artificial Intelligence Approach to Object Identification and Classification Digvijay I. Sikka, Pramod K. Varshney, Vincent C. Vannicola Event: SPIE 1989 Technical Symposium on Aerospace Sensing, 1989, Orlando, FL, United States.*
(Continued)

*Primary Examiner* — Jason Pringle-Parker
(74) *Attorney, Agent, or Firm* — Zilka-Kotab, P.C.

(57) ABSTRACT

A method, computer readable medium, and system are disclosed for image processing to reduce aliasing using a temporal anti-aliasing algorithm modified to implement variance clipping. The method includes the step of generating a current frame of image data in a memory. Then, each pixel in the current frame of image data is processed by: sampling a resolved pixel color for a corresponding pixel in a previous frame of image data stored in the memory, adjusting the resolved pixel color based on a statistical distribution of color values for a plurality of samples in the neighborhood of the pixel in the current frame of image data to generate an adjusted pixel color, and blending a color value for the pixel in the current frame of image data with the adjusted pixel color to generate a resolved pixel color for the pixel in the current frame of image data.

18 Claims, 14 Drawing Sheets

(51) Int. Cl.
   *H04N 13/122* (2018.01)
   *H04N 13/15* (2018.01)
   *G06T 11/40* (2006.01)
   *H04N 13/106* (2018.01)
   *H04N 13/00* (2018.01)

(52) U.S. Cl.
   CPC ..... *H04N 13/15* (2018.05); *H04N 2013/0081* (2013.01)

(56) References Cited

OTHER PUBLICATIONS

Yang et al., "Amortized Supersampling," SIGGRAPH Asia 2009 Conference, 2009, pp. 1-12.
Karis, G., "High Quality Temporal SuperSampling," SIGGRAPH 2014, 2014, pp. 1-55.
Malan, H., "Real-Time Global Illumination and Reflections in Dust 514," Advances in Real-Time Rendering Course, SIGGRAPH 2012, 2012, pp. 1-51.
Non-Final Office Action from U.S. Appl. No. 16/052,537, dated Sep. 6, 2018.
Salvi et al., U.S. Appl. No. 16/052,537, filed Aug. 1, 2018.

\* cited by examiner

METHOD FOR DATA REUSE AND APPLICATIONS TO SPATIO-TEMPORAL SUPERSAMPLING AND DE-NOISING

CROSS-REFERENCE TO RELATED APPLICATIONS

This application claims the benefit of U.S. Provisional Application No. 62/309,922 titled "Data Reuse for Spatio-Temporal Supersampling and De-noising of Images," filed Mar. 17, 2016, the entire contents of which is incorporated herein by reference.

FIELD OF THE INVENTION

The present invention relates to graphics processing, and more particularly to spatio-temporal supersampling and de-noising.

BACKGROUND

Rendering images based on three-dimensional geometry data produces two-dimensional images that can be displayed to a viewer. These images are rendered at a particular resolution. The discrete sampling nature of such rendering techniques can produce image artifacts such as aliasing. Various techniques may be employed to reduce the effects of aliasing. One such technique is supersample anti-aliasing. In supersample anti-aliasing, an image is rendered at a fine resolution and then down-sampled to produce the final image. The down-sampling effectively filters the image to reduce aliasing artifacts. In one example, each pixel of a final rendered image is generated using 16 samples per pixel. However, such techniques require additional processing capacity (or additional time) to generate the image at the higher resolution. In applications such as real-time image generation for video, each image must be generated within a fixed duration in order to meet frame rate demands of the display system. These requirements can limit the complexity of a scene being rendered and/or reduce image quality.

A workaround to this issue has been developed that is referred to as temporal anti-aliasing (TAA). In TAA, different samples for a pixel are generated in each successive frame and then the samples from different frames are combined to generate the final color for each pixel in the current frame. For example, one sample may be generated for each pixel in the current frame and then filtered with color values for that pixel in the previous N frames to come up with a filtered color value for the current frame. The sample location is changed each frame so that the filtered color value for the current frame may approximate a color value generated using a supersample anti-aliasing technique. This could result in a good approximation if the underlying geometry data is consistent across the N frames, but in most cases, there will be some objects that move within the scene from one frame to another, or the virtual camera position may move relative to the objects from one frame to another. When this happens, artifacts may appear due to filtering color values from different objects across a number of different frames. Ghosting of moving objects or changing specular highlights can cause significant reduction in image quality. Thus, there is a need for addressing these issues and/or other issues associated with the prior art.

SUMMARY

A method, computer readable medium, and system are disclosed for image processing to reduce aliasing using a temporal anti-aliasing algorithm modified to implement variance clipping. The method includes the step of generating a current frame of image data in a memory. Then, each pixel in the current frame of image data is processed by: sampling a resolved pixel color for a corresponding pixel in a previous frame of image data stored in the memory, adjusting the resolved pixel color based on a statistical distribution of color values for a plurality of samples in the neighborhood of the pixel in the current frame of image data to generate an adjusted pixel color, and blending a color value for the pixel in the current frame of image data with the adjusted pixel color to generate a resolved pixel color for the pixel in the current frame of image data.

DETAILED DESCRIPTION

Robust methods for performing temporal anti-aliasing have been developed. Many of these methods have significant costs that make them difficult to implement in time-critical applications, such as real-time rendering. Some of these techniques implement rejection of old samples by testing depth, normal, material identifiers, or object identifiers associated with previous samples against the same parameter associated with a current sample. For example, a shader program that generates a color value for a sample in a current frame may also store a corresponding object identifier for the object that the sample intersects in the current frame. When the sample is combined with samples from previous frames, only those samples that correspond to the same object identifier will be used to generate a resolved color value for the pixel. Thus, samples from different objects caused by changes in camera position or relative motion of objects in the scene may not affect the resolved color value for the pixel in the current frame. However, the added cost of storing and checking these parameters when performing TAA can reduce the quality or complexity of an image that can be rendered in the limited time allowed when rendering frames at a particular frame rate.

One solution to this problem is to implement neighborhood clamping or clipping of the color values sampled from the previous frame of image data. In neighborhood clamping or clipping, a resolved color value sampled from a previous frame of image data is adjusted based on the color values for samples in the neighborhood of the pixel in the current frame. For example, samples generated in a 3×3 pixel window centered on a particular pixel are utilized to generate a bounding box that contains the color values for all samples within the window. The resolved color value sampled from the previous frame is then clamped or clipped based on this bounding box to generate an adjusted color value that is similar to other nearby samples. However, a bounding box in a particular color space is a poor approximation of the convex hull that contains all the color values associated with samples in the window. Particular outliers may skew the bounding box greatly such that the adjusted resolved color value is not really representative of the other color values associated with samples in the window. Thus a new technique for implementing temporal anti-aliasing has been developed.

Figure 1:
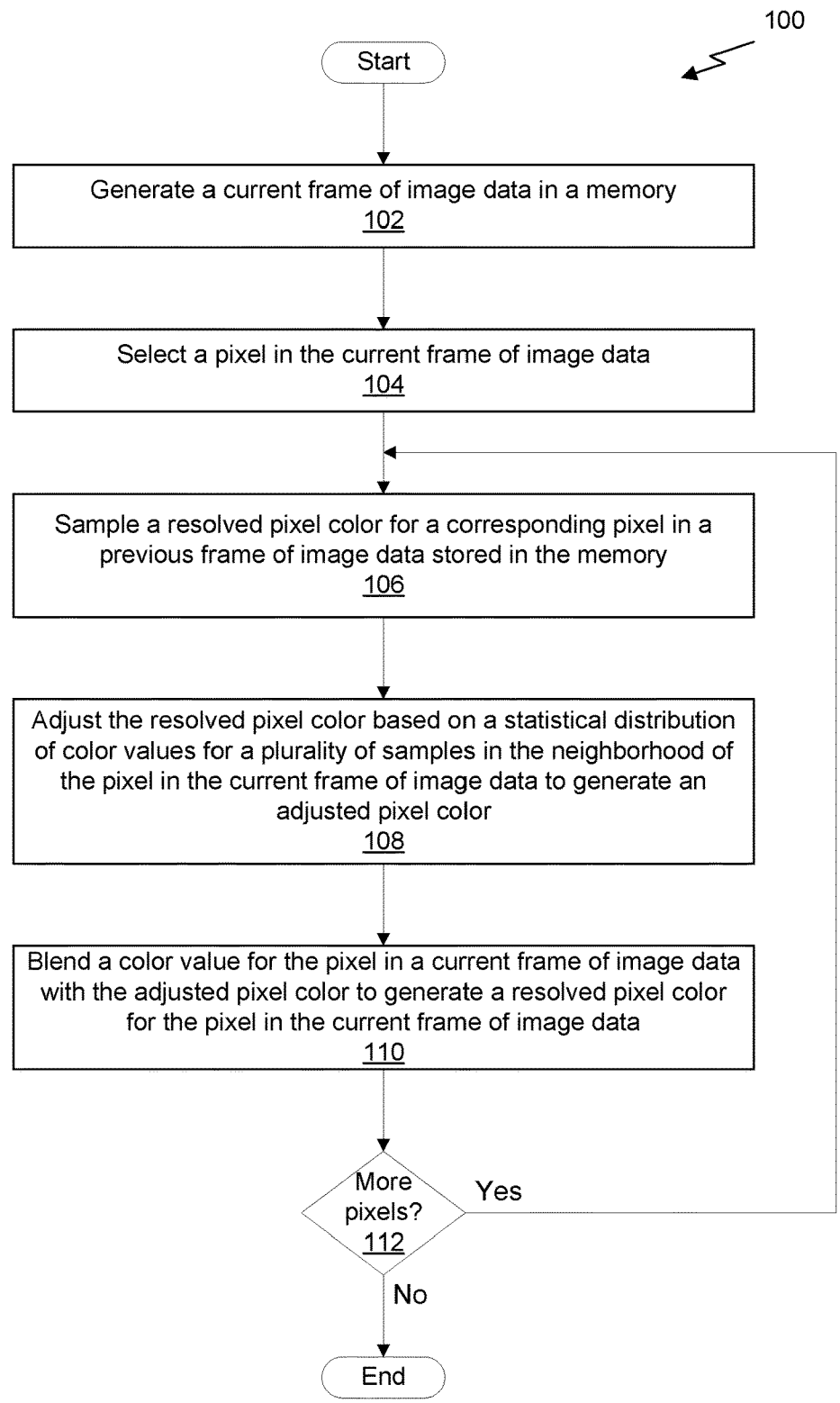
FIG. 1 illustrates a flowchart of a method for implementing variance clipping within a temporal anti-aliasing algorithm, in accordance with one embodiment.

FIG. 1 illustrates a flowchart of a method 100 for implementing variance clipping within a temporal anti-aliasing algorithm, in accordance with one embodiment. It will be appreciated that the method 100 is described within the scope of software executed by a processor; however, in some embodiments, the method 100 may be implemented in hardware or some combination of hardware and software. The method 100 begins at step 102, where a current frame of image data is generated in a memory. In one embodiment, a parallel processing unit renders three-dimensional geometry data for a scene to generate two-dimensional image data. The two-dimensional image data is stored in a frame buffer within a memory associated with the parallel processing unit. At step 104, a pixel is selected from the current frame of image data. Each pixel in the current frame of image data will be processed via a temporal anti-aliasing algorithm to generate a resolved pixel color for the pixel.

At step 106, a resolved pixel color is sampled for a corresponding pixel in a previous frame of image data stored in the memory. At step 108, the resolved pixel color is adjusted based on a statistical distribution of color values for a plurality of samples in the neighborhood of the pixel in the current frame of image data to generate an adjusted pixel color. The statistical distribution of color values may refer to a mean color value for a plurality of samples within the neighborhood of the pixel in the current frame as well as a variance of each color component in the color values for the plurality of samples. In one embodiment, the mean color value and variance are used to construct an axis-aligned bounding box corresponding to the statistical distribution of color values, and the resolved pixel color is adjusted by clamping or clipping the resolved pixel color to the axis-aligned bounding box. At step 110, a color value for the pixel in the current frame of image data is blended with the adjusted pixel color to generate a resolved pixel color for the pixel in the current frame of image data. At step 112, the next pixel in the current frame of image data is selected for processing according to steps 106 through 110. Once all of the pixels in the current frame of image data have been processed, the method 100 terminates.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
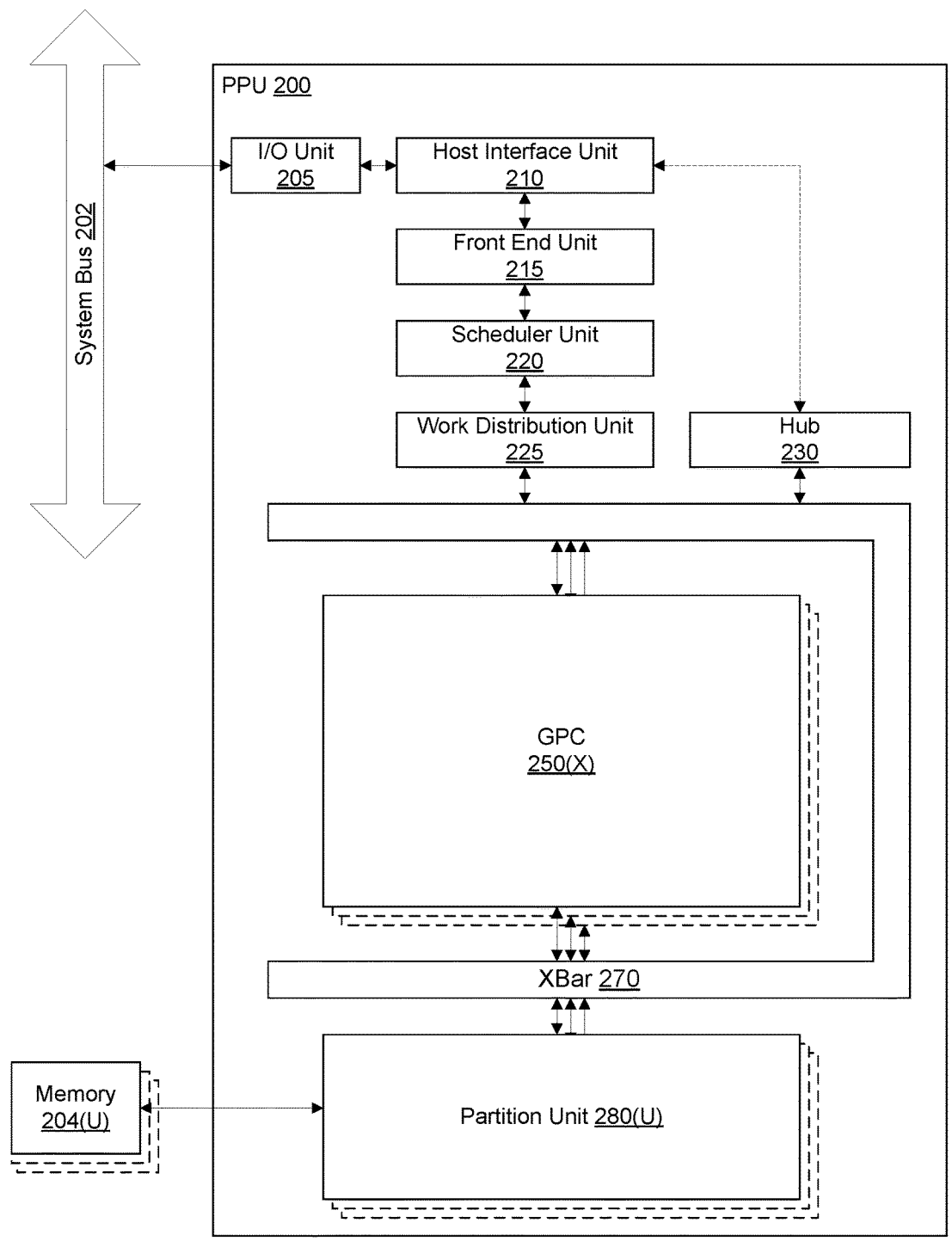
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
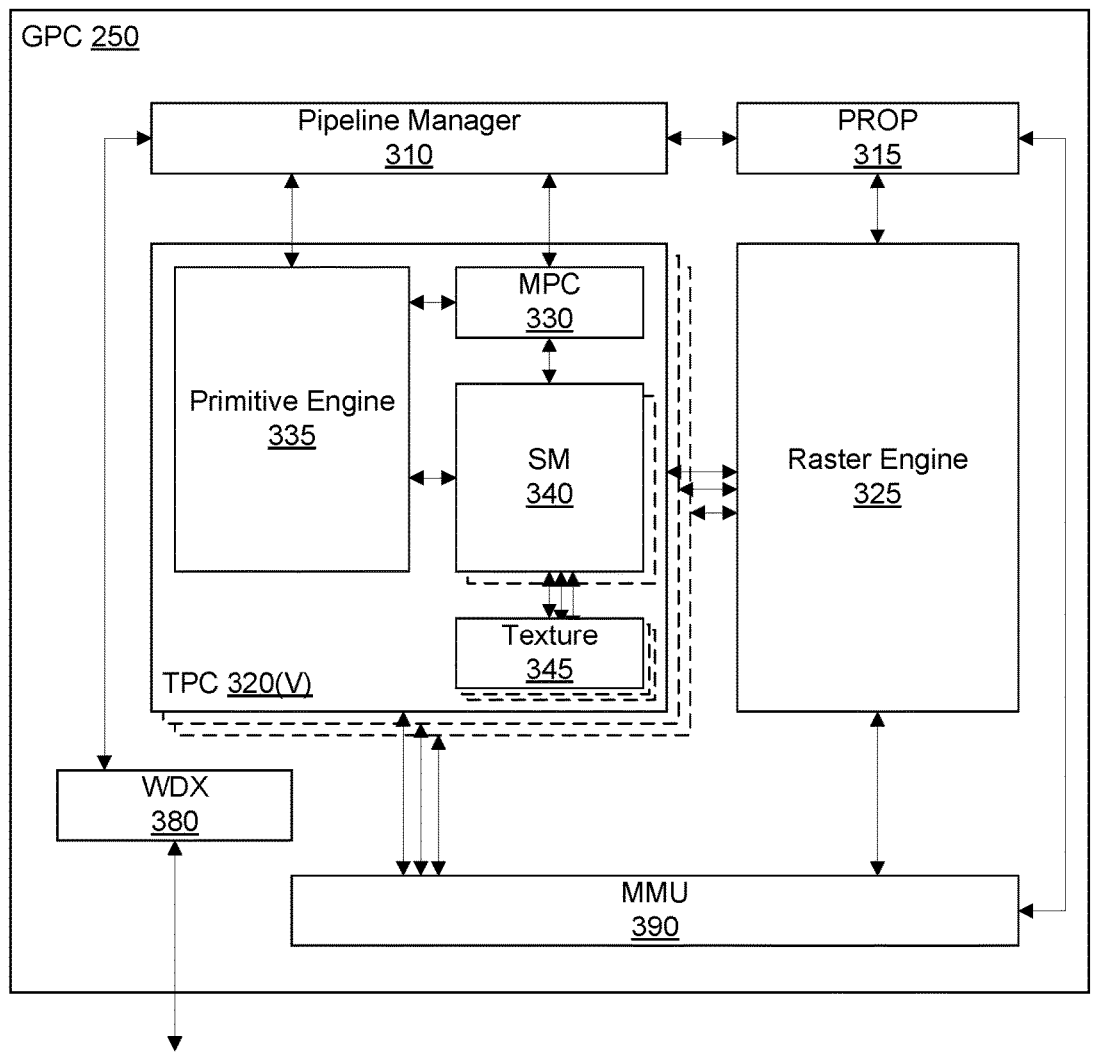
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
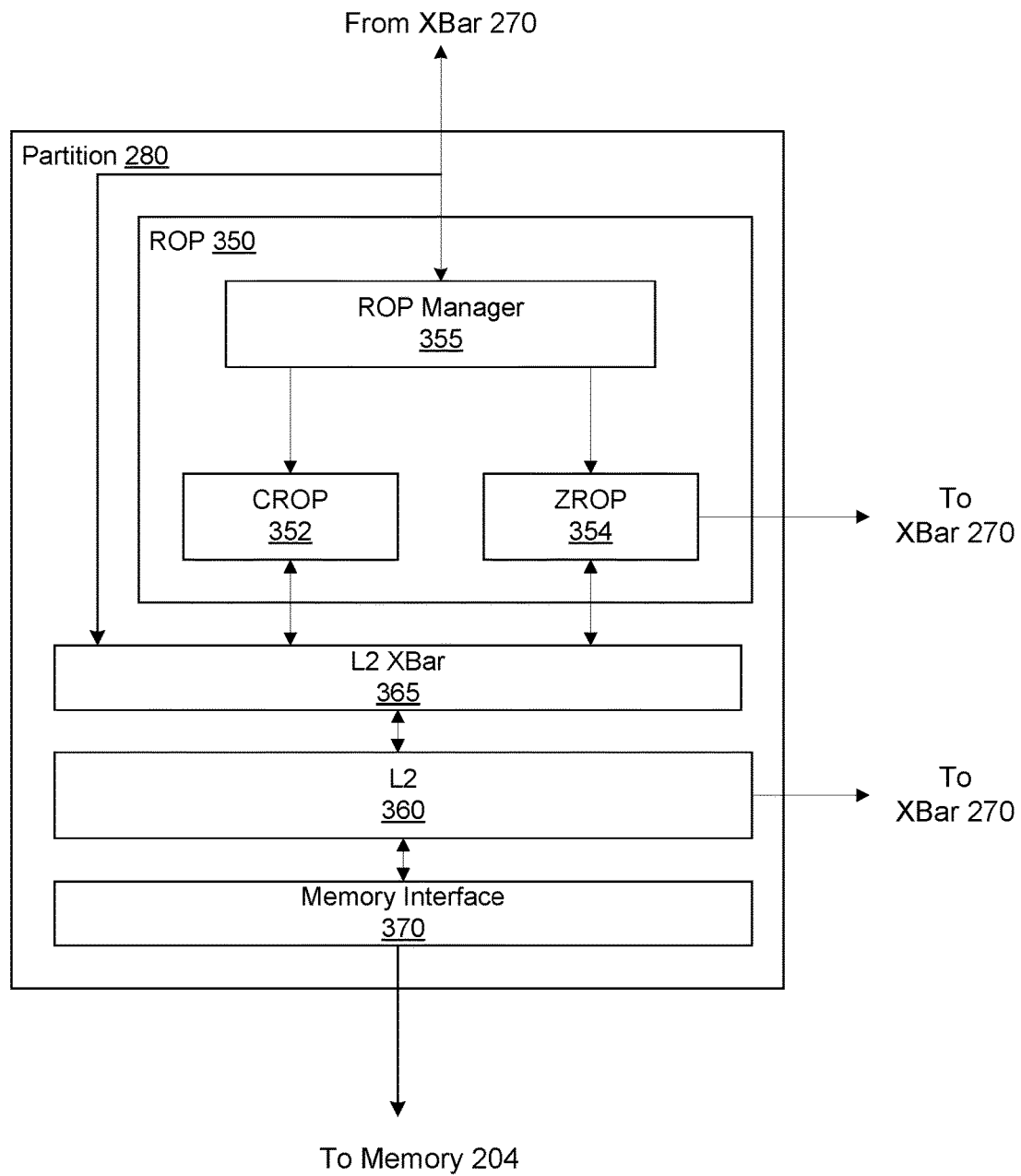
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
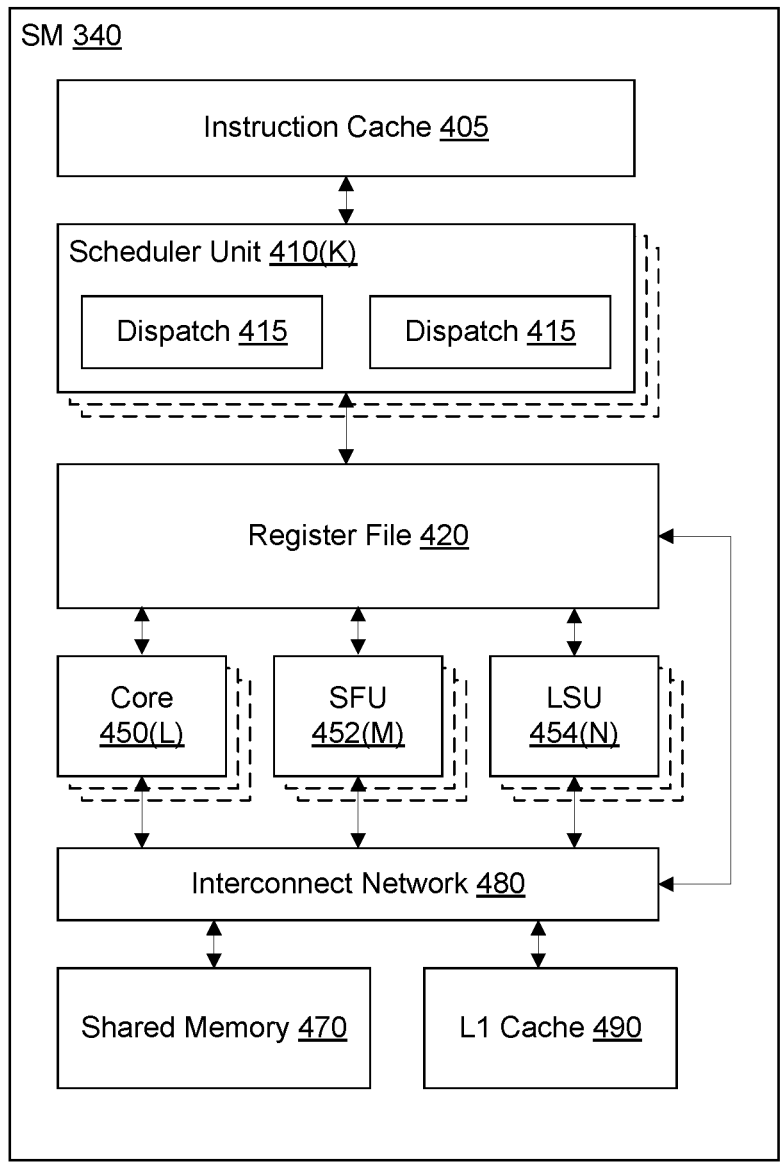
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
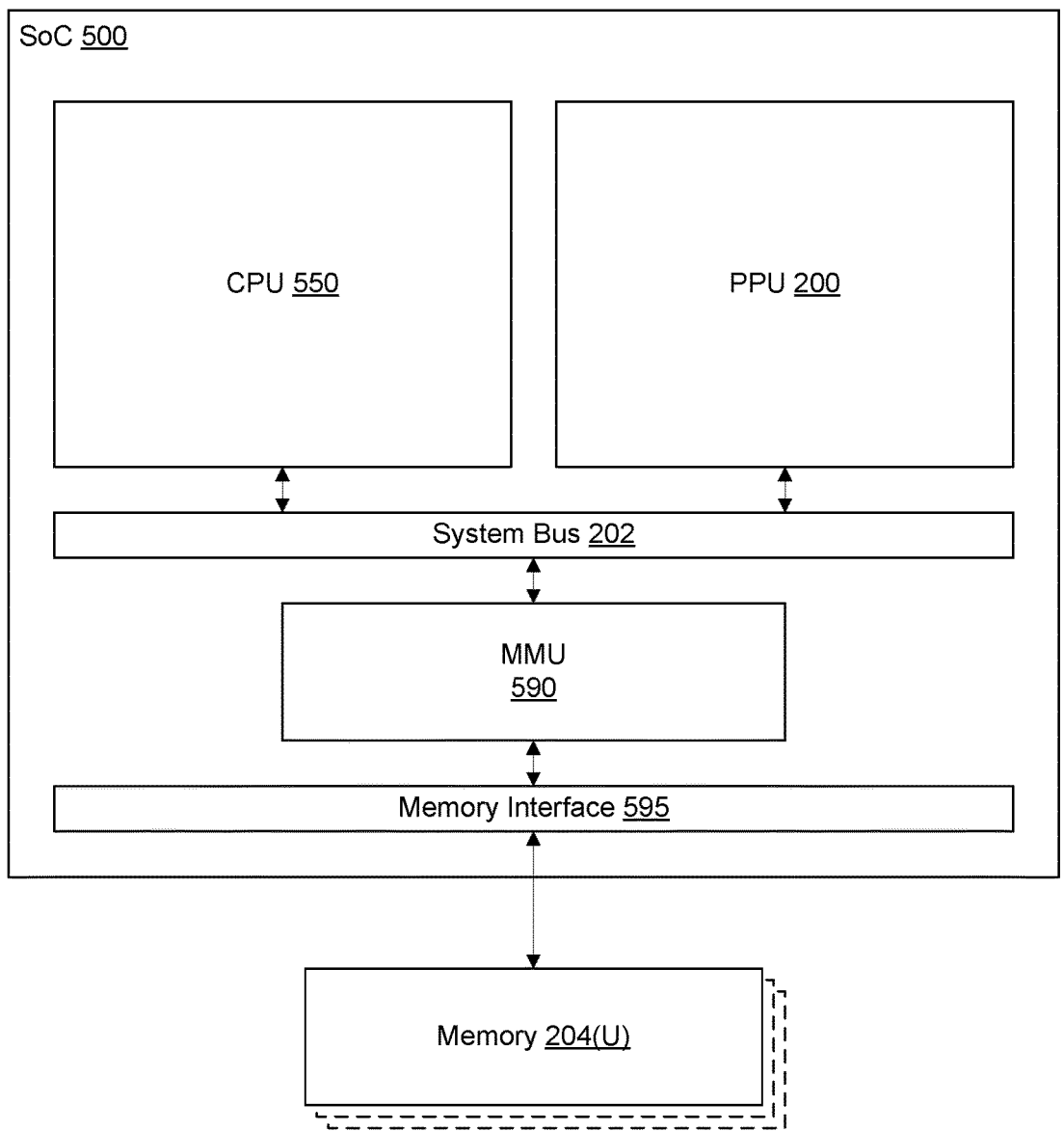
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
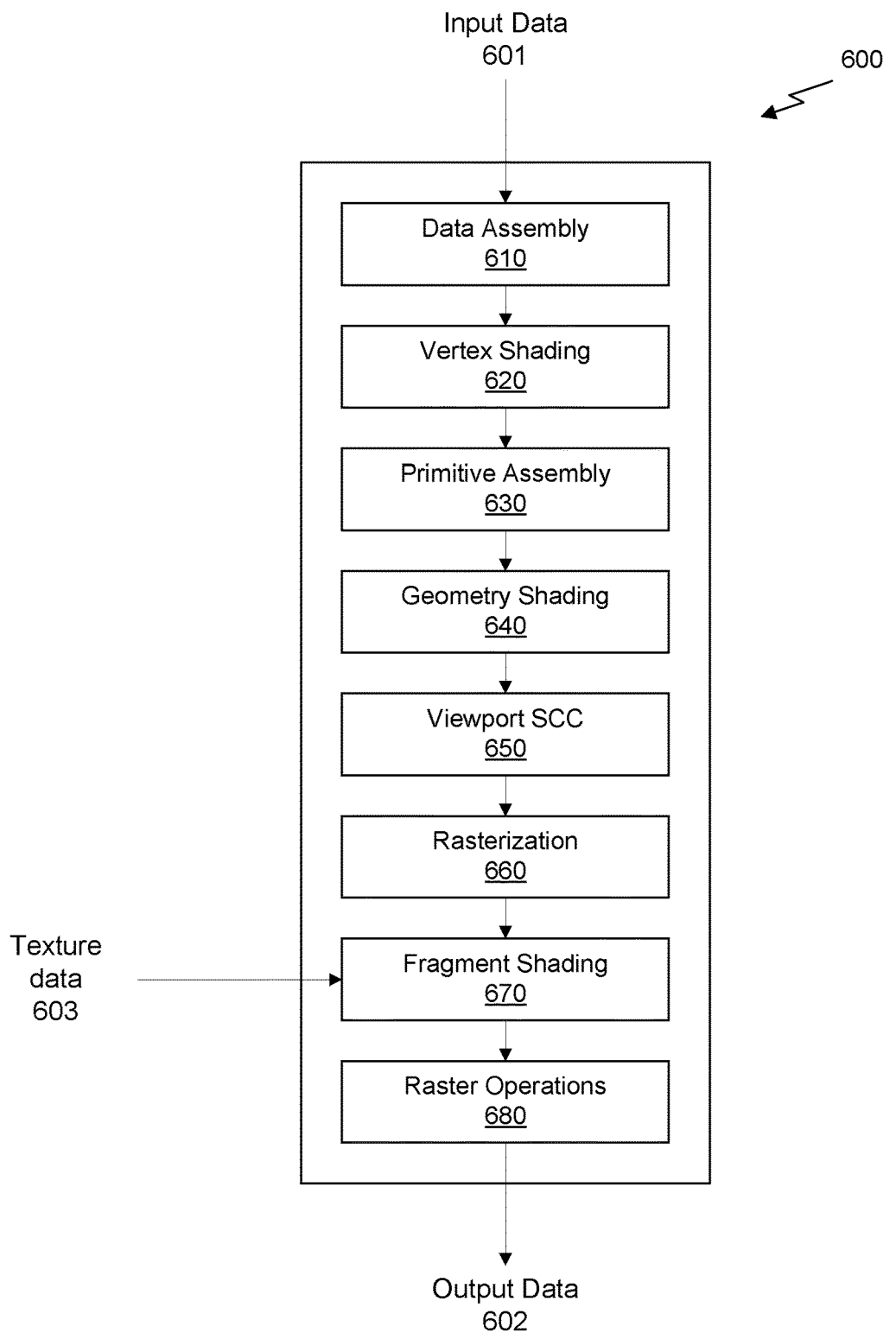
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

In one embodiment, the fragment shading stage 670 may sample a texture map using the texture unit(s) 345 of PPU 200. Texture data 603 may be read from the memory 204 and sampled using the texture unit 345 hardware. The texture unit 345 may return a sampled value to the fragment shading stage 670 to be processed by the fragment shader.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640).

Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Temporal Anti-Aliasing with Variance Clipping

Figure 7A:
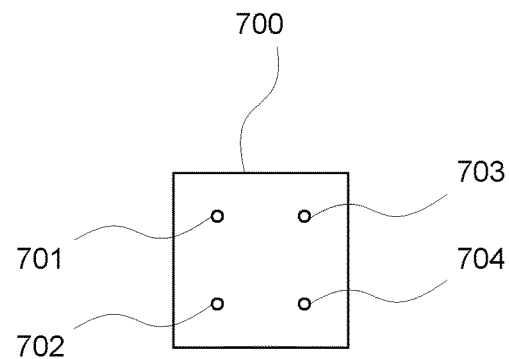
FIG. 7A illustrates a basic concept for supersample anti-aliasing, in accordance with the prior art.

FIG. 7A illustrates a basic concept for supersample anti-aliasing (SSAA), in accordance with the prior art. As shown in FIG. 7A, a color value for a pixel 700 may be generated by filtering color values for multiple samples. In one embodiment, four samples are defined for each pixel, each sample located at the center of one quadrant of the pixel. Sample 701 is located in the upper left quadrant of the pixel 700, sample 702 is located in a lower left quadrant of the pixel 700, sample 703 is located in an upper right quadrant of the pixel, and sample 704 is located in a lower right quadrant of the pixel. Each sample may be rendered independently and then the rendered color values for the samples are filtered to generate a single, resolved color value for the pixel 700. Although four samples are shown, different implementations of SSAA may utilize various numbers of samples per pixel (e.g., 16 samples per pixel). In addition, the samples may not be uniformly distributed within the pixel. For example, jittering the location of each sample within the corresponding quadrant of the pixel may offset the location of samples 701-704 from the center of each quadrant. Some implementations of SSAA allow a programmer to specify the location of each sample by writing sample locations to special registers.

SSAA is one of the simplest ways to reduce aliasing artifacts in rendered images. However, the time required to render multiple samples per pixel scales linearly with the number of samples. Thus, the required rendering time to generate each image can quickly reduce the effective frame rate of rendered images when generating video data as the number of samples per pixel is increased. As the complexity of a scene is increased as well, frame rates can quickly drop to the point that the rendering of real-time video is not practical using SSAA.

Figure 7B:
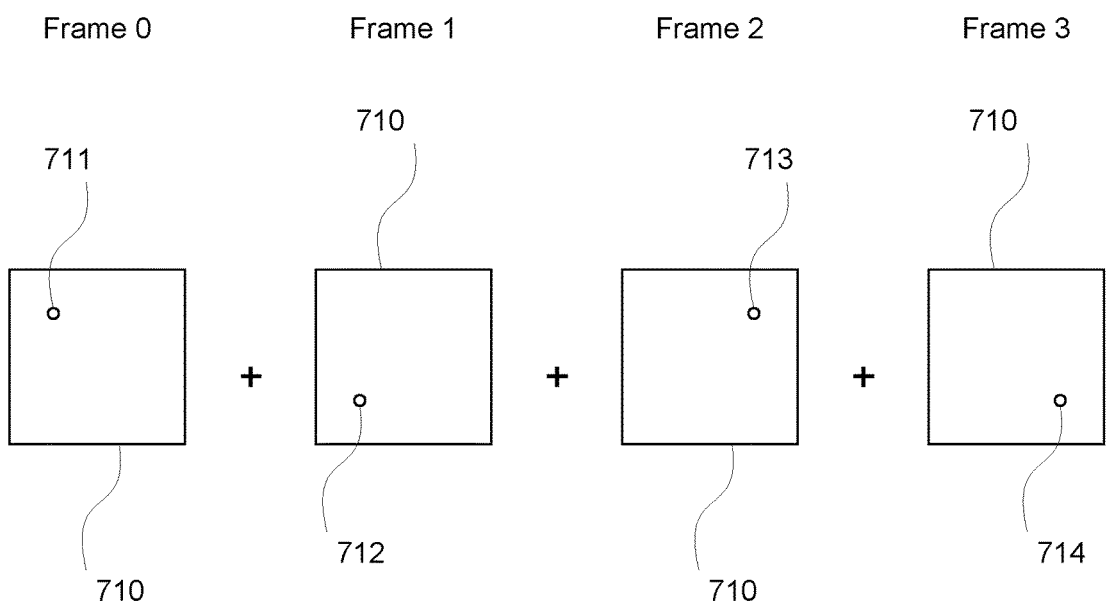
FIG. 7B illustrates a basic concept for temporal anti-aliasing, in accordance with the prior art.

FIG. 7B illustrates a basic concept for temporal anti-aliasing (TAA), in accordance with the prior art. As shown in FIG. 7B, samples from multiple frames corresponding to the same pixel 710 may be filtered to produce a final color value for the pixel 710 in the current frame. A color value for a first sample 711 is generated during a first frame (Frame 0), a color value for a second sample 712 is generated during a second frame (Frame 1), a color value for a third sample 713 is generated during a third frame (Frame 2), and a color value for a fourth sample 714 is generated during a fourth frame (Frame 3). The locations of the samples in each frame may be jittered to calculate color values for the pixel 710 at different sample location in the group of frames. These four color values may then be filtered to produce a color value for the pixel 710 in the current frame (i.e., the fourth frame). It will be appreciated that if the camera position changes or the objects that overlap the pixel 710 change between the first and fourth frames, then the resulting sample colors may correspond to different objects or be associated with changing specular highlights. Thus, the color values for the pixel over the group of frames may change drastically, thereby affecting the filtered color value in the current frame. Filtering color values sampled from different objects over multiple frames may result in artifacts in the current frame caused by TAA, such as ghosting. These artifacts can be worse than the aliasing artifacts that TAA is designed to reduce.

One technique for implementing TAA is to track which objects a sample is associated with using one or more object parameters such as depth values associated with the sample, normal vectors associated with the sample, a material identifier or an object identifier associated with the sample, and so forth. If a sample from a previous frame is associated with the same object parameter as a sample from the current frame, then the sample may be valid, but if the sample from the previous frame is associated with a different object parameter as the sample from the current frame, then the sample may be invalid as potentially being rendered as part of a different object. Thus, only valid samples from previous frames are blended with samples from the current frame.

It will be appreciated that temporal antialiasing may be implemented utilizing a different number of frames and/or a different number of samples per pixel. For example, four samples per pixel may be generated for each frame and then combined with four samples for the pixel from each of three previous frames. Alternatively, a filtered color may be generated using samples from two frames (i.e., the current frame and previous frame) or eight frames rather than four frames.

Figure 8A:
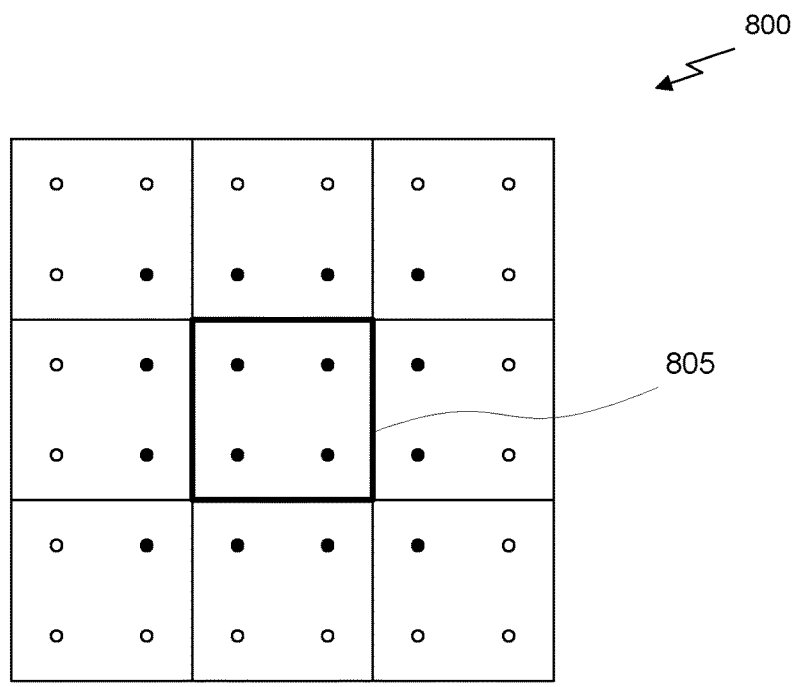
FIGS. 8A & 8B illustrate a neighborhood color clamping or clipping technique implemented within a temporal anti-aliasing algorithm, in accordance with the prior art.
Figure 8B:
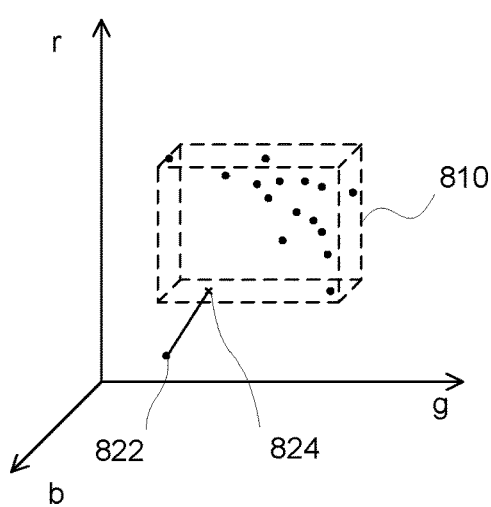

FIGS. 8A & 8B illustrate a neighborhood color clamping or clipping (NCC) technique implemented within a temporal anti-aliasing (TAA) algorithm, in accordance with the prior art. TAA implemented with NCC is one technique for reducing artifacts from blending colors associated with samples in one or more previous frames that may be significantly different from colors associated with samples in the current frame without checking object parameters to determine if the previous samples are valid or invalid. In one implementation, a new color value for the pixel in the current frame is blended with a resolved color for the pixel from the previous frame, as given by the following equation:

$$P_n = \alpha \cdot C_n + (1-\alpha) \cdot P_{n-1} \qquad \text{(Eq. 1)}$$

where $C_n$ is a color value for the pixel in the current frame, $\alpha$ is a blending coefficient (such as 0.1), and $P_i$ is the resolved color value for the pixel in frame i. The color value $C_n$ for the pixel in the current frame may be a color generated by filtering one or more samples rendered for the pixel in the current image frame. In one embodiment, the color value may be a single sample rendered for the pixel. In another embodiment, the color value may be generated by blending color values from four or more samples rendered for the pixel. The blending operation results in a resolved color value for the pixel that reflects an exponential moving average that continuously integrates the final pixel color for a pixel over a number of frames. Changing the blending coefficient $\alpha$ affects how quickly the moving average adjusts to the filtered color value for the pixel in the current frame.

TAA using NCC adjusts the resolved pixel color for the previous frame $P_{n-1}$ based on the distribution of color samples within a neighborhood of the pixel in the current frame. For example, as shown in FIG. 8A, a 3×3 pixel window 800 in a current frame includes four samples per pixel rendered in the current frame. These four samples can be filtered to generate the filtered color value $C_n$ for the pixel 805 in the current frame. The filtered color value $C_n$ for the pixel 805 in the current frame is then blended with a resolved color value $P_{n-1}$ for the pixel 805 in a previous frame, which is clamped or clipped based on a distribution of color values for samples in the neighborhood of pixel 805 in the current frame. In one implementation, sixteen samples centered in the window 800 of the current image frame (shown as black circles) are used to generate an axis-aligned bounding box 810 (AABB) in a color space that represents the distribution of the samples, as shown in FIG. 8B. For example, each of the samples encodes a color value in an RGB color space. These samples are plotted on a 3-axis graph, with each axis corresponding to one color component of the encoded color value. The AABB 810 includes 6 planes, each pair of corresponding planes corresponding to a minimum and maximum value for each of the encoded color components encoded in all sixteen samples. It will be appreciated that the size of the window and/or number of samples within the window may be different in different implementations, such as by using a 5×5 pixel window having one sample per pixel or selecting all 36 samples in the 3×3 pixel window to construct the AABB.

TAA with NCC adjusts the resolved color value $P_{n-1}$ for the pixel 805 in the previous frame using the AABB 810. For example, a resolved color value 822 from a previous frame is plotted in the graph. It is apparent that the resolved color value 822 is outside of the AABB 810 and, therefore, will be clamped or clipped to the AABB 810. As used herein, clamping may refer to adjusting the color value such that the color value lies on at least one plane of the AABB 810, and clipping may refer to adjusting the color value along a ray from a first value to a previous value until the color value lies on at least one plane of the AABB 810. Clamping or clipping may be used interchangeably throughout as either operation will have the desired effect of adjusting the resolved color value 822 closer to the color values within the neighborhood of the pixel 805. In one embodiment, a ray is drawn, conceptually, within the color space from the resolved color value 822 to the color value $C_n$ for the pixel 805 in the current frame. The resolved color value 822 is then adjusted to a clipped color value 824 where the ray intersects the AABB 810. In reality, the adjusted color value may be determined by solving an equation or set of equations to implement the clipping operation. A clamping operation may be performed simply by adjusting the components of the color value one at a time to match either the minimum or maximum values for the component that lie within the AABB 810.

This technique may reduce the effects from outliers due to samples for the pixel in the current frame being associated with a different object, such as samples located on opposite sides of an edge, or associated with moving specular highlights without needing to determine whether the sample should be invalidated based on various object parameters stored for each sample. The exponential moving average is "reset" when the resolved pixel color for the pixel in the previous frame differs significantly from the distribution of colors for samples in the neighborhood of the pixel in the current frame. However, one of skill in the art will appreciate that the AABB 810 still does a poor job of adjusting the resolved color value 822 to a color value that is similar to the color values for the samples in the neighborhood of the pixel 805. This is because the distribution of the color values for the samples within the AABB 810 may not be uniform. In other words, the AABB 810 does not accurately represent the convex hull that includes the color values for the samples in the neighborhood of the pixel 805. Any outliers in the set of samples may significantly change the size of the AABB 810 and, therefore, the effectiveness of the NCC operation. This is especially common where the samples within the neighborhood of the pixel 805 span an edge across multiple objects or objects in the foreground/background. Thus, there is a need to change the NCC operation in order to more accurately adjust the resolved color value from a previous frame for the blending operation.

Figure 9A:
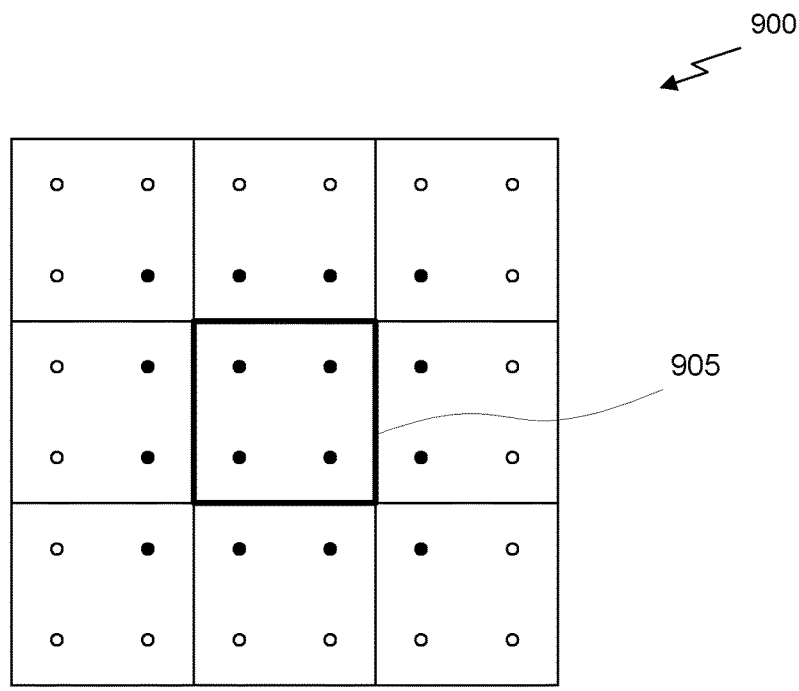
FIGS. 9A & 9B illustrate a variance clamping or clipping technique implemented within a temporal anti-aliasing algorithm, in accordance with one embodiment.
Figure 9B:
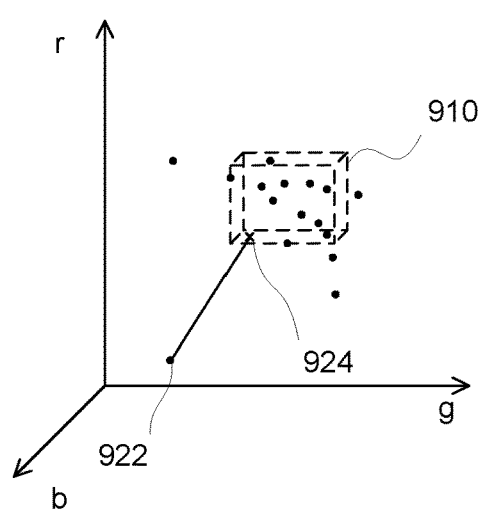

FIGS. 9A & 9B illustrate a variance clamping or clipping (VCC) technique implemented within a TAA algorithm, in accordance with one embodiment. In contrast to NCC, VCC uses a statistical distribution of the color values for a plurality of samples within the neighborhood of a particular pixel in order to construct an AABB by which a resolved color value from the previous image frame can be clipped or clamped. Using the statistical distribution of the color samples rather than the extents of color samples prevents outliers from skewing the AABB. Furthermore, the AABB can be scaled based on a coefficient to tailor the results to a particular application. In one embodiment, the mean and standard deviation for each color component (i.e., the first color moment and the second color moment of the color values for the plurality of samples) are used to construct the AABB.

As shown in FIG. 9A, a 3×3 pixel window 900 in a current image frame includes eight pixels surrounding a center pixel 905. A color value $C_n$ for the center pixel 905 in the current image frame is generated by filtering one or more samples of the pixel 905 rendered for the current frame. In one embodiment, four samples rendered for the current frame are filtered to generate the color value $C_n$. In another embodiment, one sample for the pixel 905 is rendered for the current frame and used as the color value $C_n$. It will be appreciated that the color value may be generated using any number of samples rendered for the pixel in the current image frame, even using conventional techniques such as supersample anti-aliasing (SSAA) and multi-sample anti-aliasing (MSAA).

In one embodiment, a set of samples centered in the window 900 of the current frame (shown as black circles) are used to generate an axis-aligned bounding box 910 (AABB) based on the statistical distribution of color values for the set of samples. The AABB 910 is centered on a mean color value of the set of samples and has extents based on the standard deviation of color values in the set of samples. For example, a mean color value μ associated with the sixteen samples may be calculated as:

$$\mu = \frac{\sum_{i=1}^{n} x_i}{n} \qquad \text{(Eq. 2)}$$

where n is the number of samples and $x_i$ is the color value of each sample. The AABB 910 may be centered on the mean color value. It will be appreciated that the mean color value may be calculated for each color component such that the mean color value μ is a vector of mean values in a color space such as RGB. The extents of the AABB 910 are based on the standard deviation of the color values for the samples, which may be calculated based on the variance of the color values given as:

$$\sigma^2 = \frac{\sum_{i=1}^{n} (x_i - \mu)^2}{n} \qquad \text{(Eq. 3)}$$

where $\sigma^2$ is the variance of the color values encoded within the n samples. Equations 2 and 3 may be calculated independently for each of the color components in a particular color space such that the terms in the equations are all scalar values for the particular channel of the color space. The location $l_j$ of each pair of planes of the AABB 910 corresponding to a color component j of a particular color space may then be given as:

$$l_j = \mu_j \pm \gamma \sigma_j \qquad \text{(Eq. 4)}$$

where $\sigma_1$ is the standard deviation from the mean for a particular color component j of the color values corresponding to the samples and γ is a coefficient that normalizes the size of the AABB 910. The standard deviation can simply be computed from the variance by taking the square root of the variance. It will be appreciated that the choice of γ may be selected to tailor the performance of TAA with VCC to a particular application. In some cases, effective TAA has been achieved with a choice of $\gamma \in [0.75, 1.5]$.

In one embodiment, the parameters (e.g., μ and σ) for the AABB 910 may be calculated using a texture operation. More specifically, the current frame may be rendered to generate a color value C for each pixel i in the current frame. Then, a texture map associated with a first color moment is generated by applying a kernel filter to the image. The kernel filter may be, e.g., a 3×3 pixel window centered on a pixel i. For each pixel i, a first color moment m1[i] is generated by summing the color values C[j] for each pixel j in the neighborhood of pixel i, as given by:

$$m1[i] = \Sigma C[j] \quad \text{(Eq. 5)}$$

Similarly, a texture map associated with a second color moment is generated by applying a second kernel filter to the image. For each pixel i, a second color moment m2[i] is generated by summing the color values C [j] squared for each pixel j in the neighborhood of pixel i, as given by:

$$m2[i] = \Sigma C[j] * C[j] \quad \text{(Eq. 6)}$$

An approximate value for μ and σ for any pixel i can then be calculated as follows:

$$\mu = m1[i]/N \quad \text{(Eq. 7)}$$

$$\sigma = \sqrt{\frac{m2[i]}{N} - \mu * \mu} \quad \text{(Eq. 8)}$$

It will be appreciated that the value in Equation 7 is the mean color value in the kernel filter region where N is equal to the number of pixels in the filter region. Equation 8 is equivalent to the standard deviation of Equation 3. Furthermore, in one embodiment, the values in the texture maps m1 and m2 may be normalized by dividing the accumulated sum of color values or sum of color values squared by the number N of pixels in the filter region if N is fixed.

In one embodiment, the size of the filter region may be variable and adjusted dynamically. In such embodiments, a mipmapped texture associated with the first color moment and a mipmapped texture associated with the second color moment are generated based on the rendered image. The base level of the mipmapped texture associated with the first color moment is simply the color values for the image, and the base level of the mipmapped texture associated with the second color moment is simply the color values for the image, squared. Each level of the mipmap then simply filters a subset of the lower level of the mipmap to store accumulated sums of color values or color values squared for larger and larger filter regions. In one embodiment, the filter for a layer of the mipmap simply sums the values from a subset of texels in the next lower layer of the mipmap. The values for μ and σ can then be calculated according to Equations 7 and 8 using a particular level of detail (LOD) to sample the mipmapped texture map, where the LOD corresponds to a particular filter region size.

It will be appreciated that generating mipmapped textures for the first and second color moment may be utilized to reduce alias artifacts in the periphery of an image generated using foveated rendering in virtual reality applications. In foveated rendering, an image may be rendered at different resolutions in the periphery than in an area of focus. By applying TAA with VCC to an image rendered using different resolutions, aliasing artifacts can be alleviated in the periphery. The pre-generated mipmapped textures may be used to apply TAA with VCC using variable window sizes in different portions of the image, such as using 4×4 pixel windows for pixels in the areas of focus while using 16×16 pixel windows for pixels in the periphery.

As shown in FIG. 9B, the AABB 910 generated based on the distribution of color values within the samples may be smaller than the AABB 810 and may not be inclusive of all samples in the neighborhood of pixel 905. The result is that the clamping or clipping operation on the resolved pixel color 922 from the previous frame of image data generates an adjusted color value 924 that is closer to the color value $C_n$ for the pixel 905 in the current frame. Implementation of this VCC technique within a TAA algorithm in this fashion decreases artifacts due to ghosting.

In one embodiment, TAA with VCC can be utilized to reduce the workload for rendering each frame. In such an embodiment, the current frame can be generated with "holes" where certain subsets of pixels are not rendered. For example, every other pixel can be rendered in the current frame. In such an embodiment, the statistical distribution for each pixel can be calculated using a larger window and only using color values for samples included in pixels that were rendered in the current image frame. The blending operation may then omit the component of the color value for the pixel in the current frame and only incorporate the resolved color value for the pixel from the previous frame, clamped or clipped based on the AABB constructed from the statistical distribution of color values within the neighborhood of the pixel in the current frame. By alternating which pixels are rendered in successive frames, over time, the result is that the blended image will converge to the correct result as the accumulated pixel color will include a term for the rendered color value for the pixel every other frame, for example. This technique can be utilized to render fewer pixels per frame, which saves on time for rendering the current frame in the GPU enabling reduced power consumption or more complex rendering algorithms to be utilized to shade the current frame. So, TAA with VCC can be used to filter image data not only in time, but in space because the resolved pixel colors for a pixel may be adjusted based on color values for other pixels in the neighborhood of a pixel.

Figure 10:
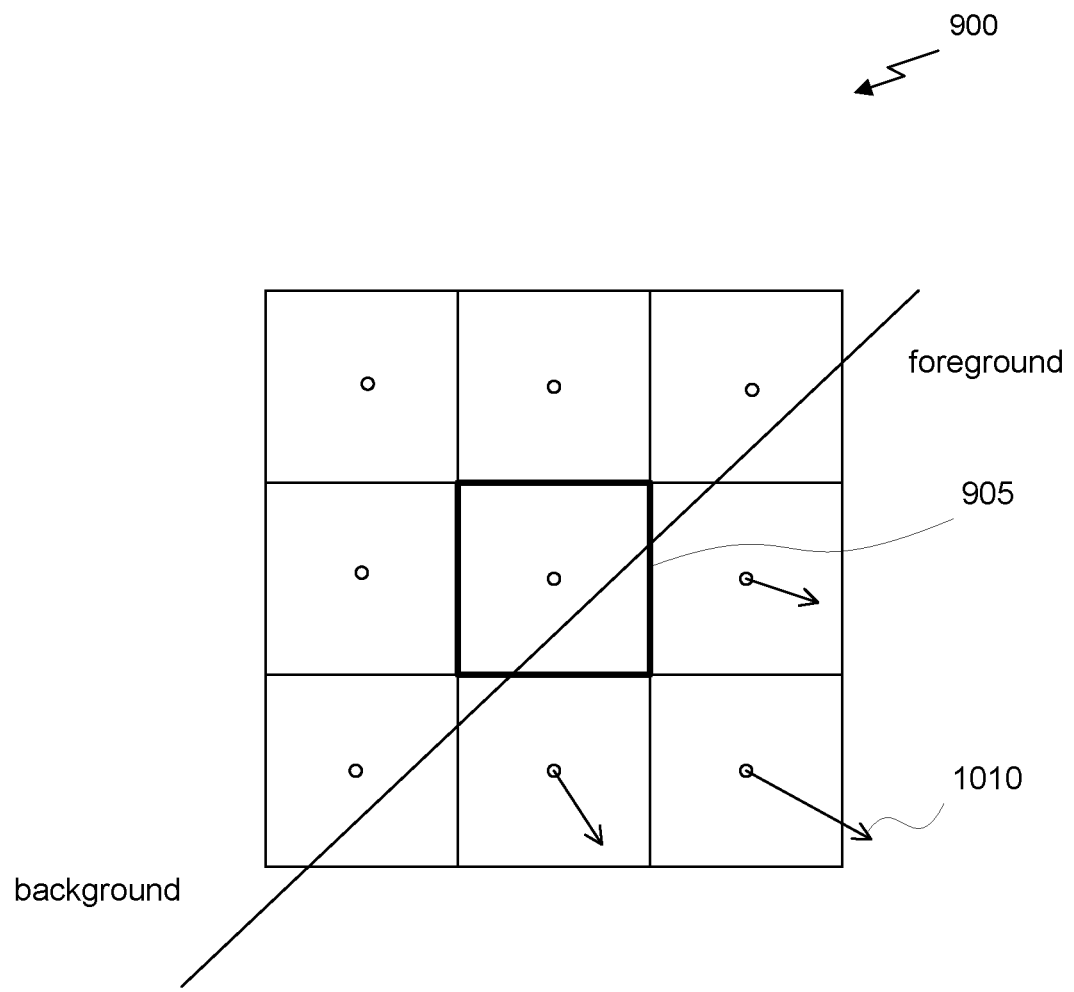
FIG. 10 illustrates a variance clamping or clipping operation utilizing motion vectors, in accordance with another embodiment.

FIG. 10 illustrates a VCC operation utilizing motion vectors, in accordance with another embodiment. Again, the VCC operation is useful for reducing artifacts caused by blending colors rendered from different objects over a plurality of frames. One technique for reducing the effects of these artifacts is to utilize motion vector information to select the resolved color value $P_{n-1}$ for the pixel 905 in the previous frame prior to clamping or clipping the resolved color value $P_{n-1}$ using the AABB 910. In one embodiment, each pixel in the current frame may be associated with a motion vector 1010 that indicates a relative offset in coordinates that maps the pixel location from the current frame to a corresponding pixel location in the previous frame. In one embodiment, the motion vector having the maximum magnitude in the set of motion vectors associated with pixels in the window 910 may be selected and utilized when reading the resolved color value $P_{n-1}$ for the pixel 905 from the previous frame. In other words, the resolved color value $P_{n-1}$ may not be read from the same pixel coordinates in the previous frame as the coordinates for pixel 905 in the current frame. Utilizing motion vectors in this way attempts to blend resolved color values in the previous frame selected from approximately the same location on the same object as the filtered color value for the pixel in the current frame. In some embodiments, the resolved color value $P_{n-1}$ from the previous frame may be interpolated from color values from two or more pixels in the previous frame based on the motion vector. For example, the motion vector and bi-cubic filtering can be utilized to sample the resolved color value $P_{n-1}$ from the previous frame.

In one embodiment, a simple implementation of VCC within the TAA algorithm can be implemented using one sample per pixel. The location of the sample of each pixel can be jittered over time, and rendering the sample generates a rendered color value plus a motion vector associated with the pixel. The maximum motion vector within a neighborhood of the pixel can be used to sample the previous image frame using bi-cubic filtering to compute a resolved color value corresponding to the pixel in the previous frame. The resolved color value is then clamped or clipped based on an AABB corresponding to the statistical distribution of color values for samples rendered for the current image frame in the neighborhood of the pixel, and the adjusted color value for the pixel in the previous frame is blended with the rendered color value for the pixel in the current frame to generate a resolved color value for the pixel in the current frame.

TAA is a post processing step that can be performed by the PPU 200 after the image has been rendered using, e.g., one sample per pixel. It will be appreciated that TAA implemented with VCC helps in reducing ghosting artifacts due to the motion of objects, but repeated "reset" events caused by the clamping or clipping of color values sampled from the previous frame may cause flickering. The flickering may be a result of sampling sub-pixel sized objects or samples evaluated on different sides of an edge of an object, even when no objects in the image are moving. Steps that can be taken to reduce flickering may be to increase the number of samples when rendering each image, such as by implementing MSAA or SSAA when rendering each image frame, or by implementing normal pre-filtering techniques (e.g., Toksvig normals, LEAN mapping, etc.). In addition, reducing jittering amplitude (i.e., reducing the offset of sample coordinates between frames) may help reduce flickering, but requires a trade-off between flickering and edge anti-aliasing effectiveness.

Figure 11:
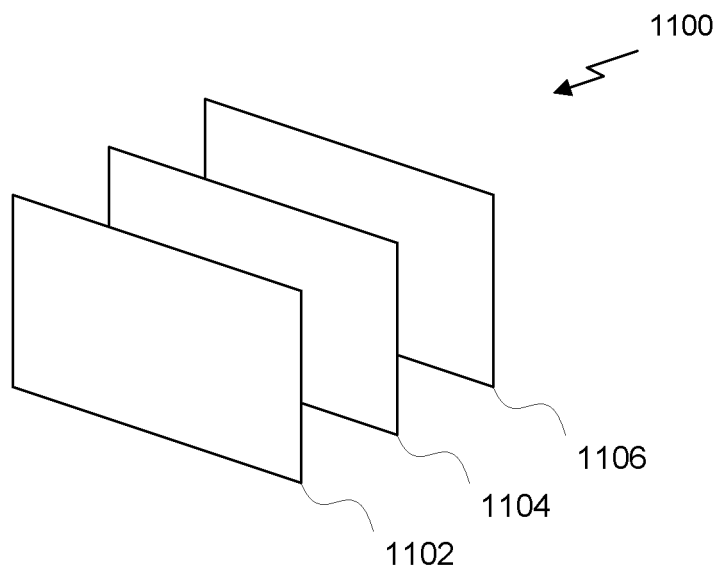
FIG. 11 illustrates a technique for applying temporal anti-aliasing with variance clamping or clipping to multi-layer images, in accordance with one embodiment.
Figure 11:
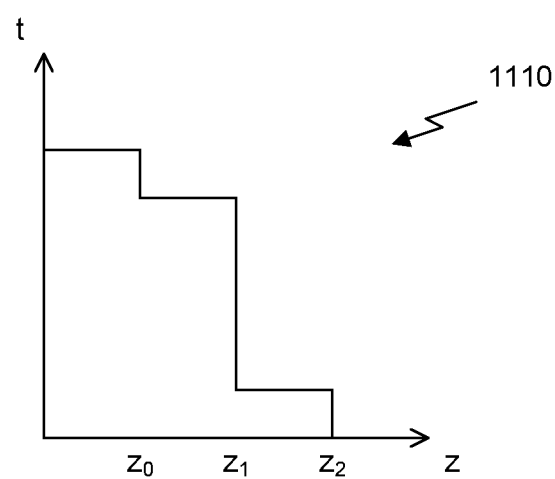

FIG. 11 illustrates a technique for applying TAA with VCC to multi-layer images, in accordance with one embodiment. As shown in FIG. 11, a composite image 1100 is comprised of a plurality of layers, such as layer 1102, layer 1104, and layer 1106. Each layer may be stored as an image using transparency, such as in a format using an RGBA color space where the alpha component encodes transparency for a pixel. In order to implement TAA with VCC for the composite image, TAA could be implemented on each layer separately and then the processed layers could be combined. However, such an implementation increases the computation time for performing TAA linearly with the number of layers. Instead, only the layer of the composite image associated with the largest transmittance value is selected and processed via TAA with VCC.

A graph 1110 shows the transmittance of light through each layer z in the composite image 1100. Transmittance t may be a measure of how much light contribution a particular layer has on the image that reaches a viewer. In other words, transmittance t is a direct measure of the level of transparency of each layer as well as knowledge of the ordering of the layers from front to back. For example, imagine that layer $z_0$ 1102 is a front layer, layer $z_1$ 1104 is an intermediate layer, and layer $z_2$ 1106 is a background layer. Layer 1106 is completely opaque and layers 1102 and 1104 are 50% transparent. The image viewed by a viewer will be a blend of 50% of layer 1102, 25% of layer 1104 and 25% of layer 1106. Thus, even though both layer 1102 and 1104 are 50% transparent, the ordering of the layers means that layer 1102 is associated with a larger reduction in transmittance than layer 1104 because layer 1104 only transmits 50% of the light that is transmitted through layer 1102.

In one embodiment, a transmittance value is calculated for each layer in a composite image. Each pixel in a first layer (i.e., the front layer) is initialized with a transmittance value of 1.0 multiplied by one minus the alpha value for the pixel, where alpha is within the range [0, 1] with 0 being transparent and 1 being opaque. Thus, for a pixel having an alpha value of 1, the transmittance value is zero, or for a pixel having and alpha value of 0.25, the transmittance value is 0.75. The transmittance values for all pixels in the image are averaged to give the transmittance value for the first layer.

The transmittance value for each pixel in the next layer is calculated by multiplying the transmittance value for a corresponding pixel in the previous layer by one minus the alpha value for the pixel in the next layer. The transmittance values for the next layer are averaged to give the transmittance value for the next layer. The transmittance values for each subsequent layer of the composite image are calculated in this manner until all layers are processed.

The relative difference between transmittance values for the layers may be used to determine the layer that contributes the most to the composite image 1100. The layer associated with the largest difference between the transmittance value for that layer and the transmittance value for the previous layer may be selected and TAA with VCC may be applied to that layer only. As shown in graph 1110, layer $z_1$ 1104 is associated with the largest relative difference in transmittance values and, therefore, would be selected as the layer to be processed by TAA with VCC. The composite image 1100 may then comprise one layer processed by TAA with VCC and a number of other layers comprised only of color samples rendered from the current frame.

In one embodiment, the transmittance value for each layer is generated by first averaging all alpha values in each layer to generate an averaged alpha value and then calculating the transmittance value for each layer based on the single averaged alpha value. While this technique is not as accurate as the technique set forth above, it may reduce the number of computations and storage requirements. In yet another embodiment, the averaged alpha value for the layer can be stochastically estimated by sampling a subset of alpha values in the image. For example, only one out of every 9 pixels may be sampled in the layer and the averaged alpha value may be calculated from the sampled values, which may reduce the complexity for calculating transmittance values for the layers even further. However, it will be appreciated that this technique may be even less accurate. Nevertheless, the transmittance values are only used to determine which layer should be processed utilizing TAA with VCC and, therefore, even selecting a non-ideal layer to process with TAA based on the approximate transmittance values will result in some improvements to image quality.

Figure 12:
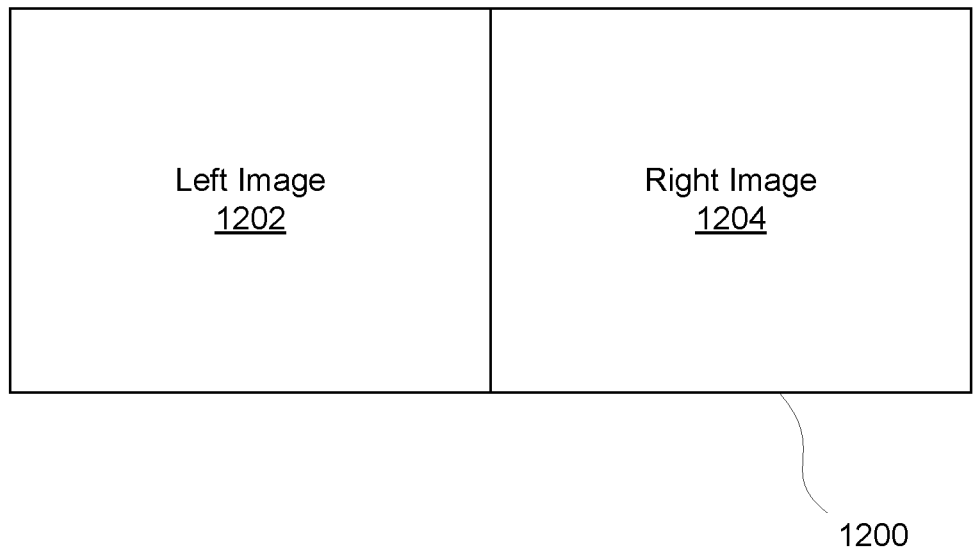
FIG. 12 illustrates a technique for applying temporal anti-aliasing with variance clamping or clipping to stereoscopic images, in accordance with one embodiment.
Figure 12:
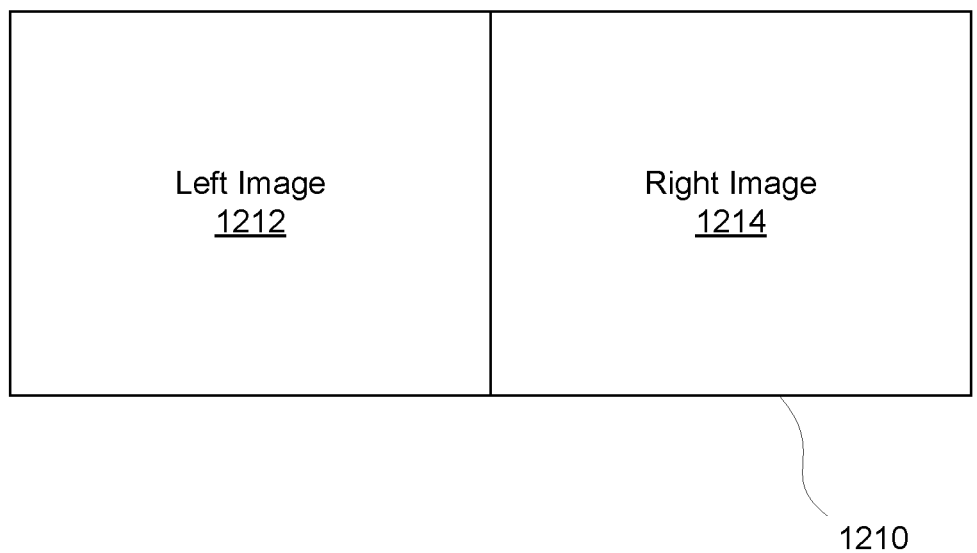

FIG. 12 illustrates a technique for applying TAA with VCC to stereoscopic images, in accordance with one embodiment. In sequences of frames in any video sequence, most frames will be very similar to adjacent frames of video because scenes typically do no change significantly in the short time between frames. TAA exploits this characteristic of typical sequences of frames to increase the effective number of samples rendered for a pixel across a plurality of frames. Similarly, stereoscopic images (i.e., a left image and a right image) are effectively two frames of video rendered from slightly different perspectives, which provides slightly different sampled locations for each corresponding pair of pixels. TAA can exploit the similarity between the left image and the right image during the blending operation to achieve spatial anti-aliasing as well as temporal anti-aliasing.

As shown in FIG. 12, a current image frame 1200 includes both a left image 1202 and a right image 1204. Each of the left image 1202 and the right image 1204 may be rendered using slightly offset viewports to simulate views from two eye positions. Objects closer to the virtual camera position will be associated with a relative offset between the left image 1202 and the right image 1204. The blending operation for generating a resolved pixel color in the left image 1202 combines a color value for the pixel from the left image 1202 and a resolved pixel color of a corresponding pixel in the right image 1204 of the current frame 1200, with a resolved pixel color for a corresponding pixel from the left image 1212 in a previous frame 1210. Similarly, the blending operation for generating a resolved pixel color in the right image 1204 combines a color value for the pixel from the right image 1204 and a resolved pixel color of a corresponding pixel in the left image 1202 of the current frame 1200, with a resolved pixel color for a corresponding pixel from the right image 1214 in a previous frame 1210. The form of the blending operation is set forth in Equations 9 & 10:

$$P_{n,l} = \alpha \cdot C_{n,l} + \alpha \cdot P_{n,r} + (1-2a) \cdot P_{n-1,l} \quad \text{(Eq. 9)}$$

$$P_{n,r} = \alpha \cdot C_{n,r} + \alpha \cdot P_{n,l} + (1-2a) \cdot P_{n-1,r} \quad \text{(Eq. 10)}$$

It will be appreciated that the resolved pixel color of a corresponding pixel in the right image 1204 of the current frame 1200 may be generated by sampling a color value for the corresponding pixel in the right image 1204 and then clipping or clamping the color value based on the AABB generated from a statistical distribution of color samples in the left image 1202 of the current frame 1200. The same can be performed for the resolved pixel color of a corresponding pixel in the left image 1202 of the current frame 1200 by sampling a color value for the corresponding pixel in the left image 1202 and then clipping or clamping the color value based on the AABB generated from a statistical distribution of color samples in the right image 1204 of the current frame 1200. By applying VCC to the sampled color values from the corresponding left or right images in a stereoscopic image pair, during the blending operation, the resolved pixel color values generated for the image filter the image in space due to view dependent shading terms, like specular highlights, reflections, etc.

In one embodiment, the color value from the corresponding stereoscopic image may be sampled based on a disparity vector associated with the pixel. An object in a left image may be offset from the corresponding object in the right image by a number of pixels. This offset is the result of the difference in viewports (or camera positions) when the image was rendered and is a property known as parallax that causes a viewer to perceive the objects in three-dimensions. A disparity vector for each pixel in one of the images may be generated by analyzing the two images. For example, block matching algorithms can be used to determine the disparity vector for each pixel in the left image 1202 that points to a corresponding pixel in the right image 1204. Alternatively, the disparity vector may be directly related to the depth of the objects in the image during rendering and, therefore, a depth map created during rendering of the stereoscopic image can be used to generate corresponding disparity vectors for each pixel in the left and/or right image of the stereoscopic image.

Thus, generating a resolved pixel color for a pixel in the left image 1202 of a current frame 1200 includes the steps of: (1) rendering the left image 1202 and right image 1204 of the current frame 1200; (2) sampling a color value of a corresponding pixel from the right image 1204 based on a disparity vector associated with the pixel in the left image 1202; (3) sampling a resolved color value for a corresponding pixel in the left image 1212 from a previous frame 1210; and (4) blending the color value for the pixel in the left image 1202 with the sampled color value for a corresponding pixel in the right image 1204 and a sampled resolved color value from the left image 1212 of a previous frame 1210 that has been clamped or clipped via VCC. A similar operation is may be performed in parallel for generating a resolved pixel color for a pixel in the right image 1204 of the current frame 1200 that includes the steps of: (1) rendering the left image 1202 and right image 1204 of the current frame 1200; (2) sampling a color value of a corresponding pixel from the left image 1202 based on a disparity vector associated with the pixel in the right image 1204; (3) sampling a resolved color value for a corresponding pixel in the right image 1214 from a previous frame 1210; and (4) blending the color value for the pixel in the right image 1204 with the sampled color value for a corresponding pixel in the left image 1202 and a sampled resolved color value from the right image 1214 of a previous frame 1210 that has been clamped or clipped via VCC.

Figure 13:
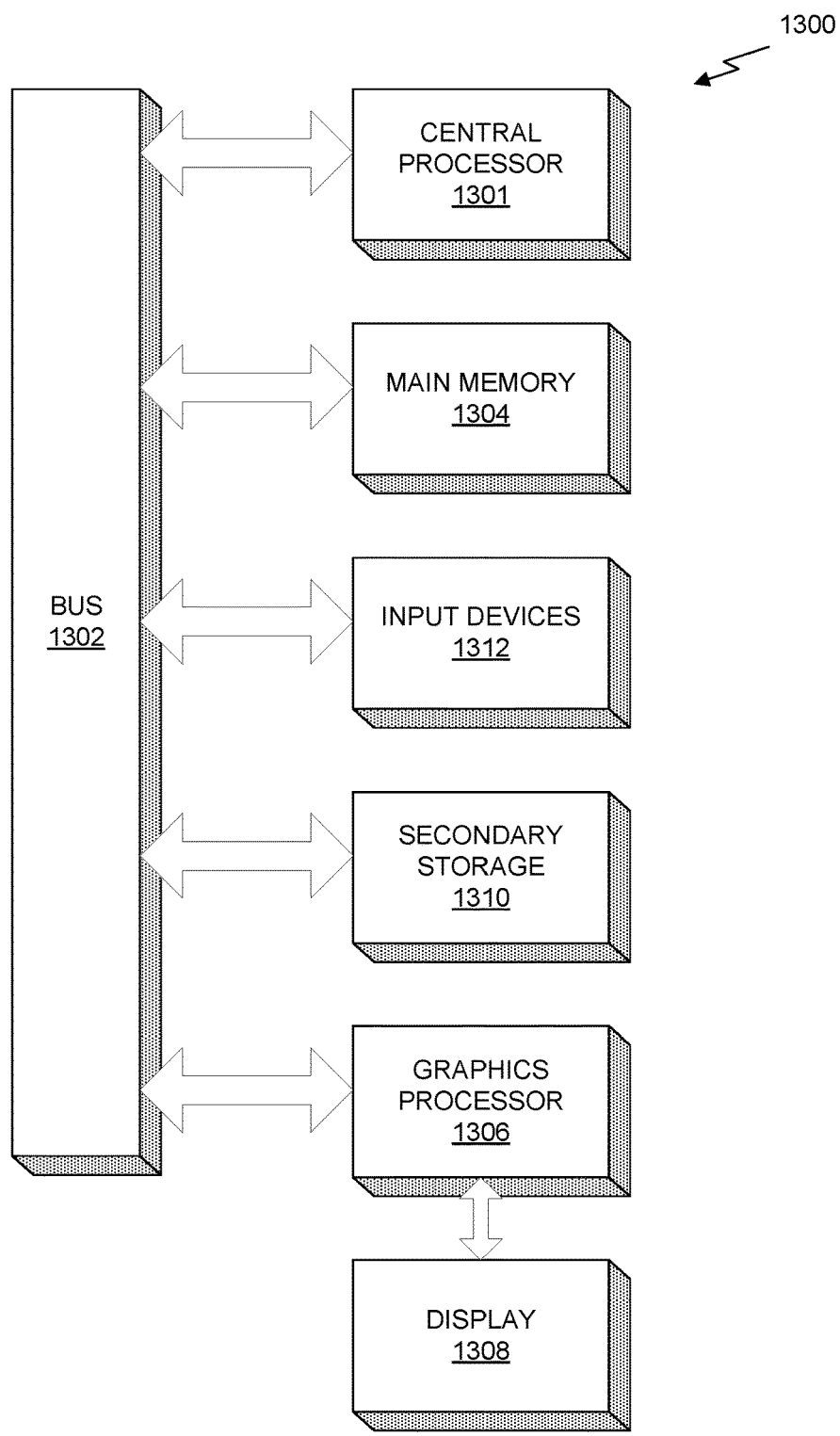
FIG. 13 illustrates an exemplary system in which the various architecture and/or functionality of the various previous embodiments may be implemented.

FIG. 13 illustrates an exemplary system 1300 in which the various architecture and/or functionality of the various previous embodiments may be implemented. As shown, a system 1300 is provided including at least one central processor 1301 that is connected to a communication bus 1302. The communication bus 1302 may be implemented using any suitable protocol, such as PCI (Peripheral Component Interconnect), PCI-Express, AGP (Accelerated Graphics Port), HyperTransport, or any other bus or point-to-point communication protocol(s). The system 1300 also includes a main memory 1304. Control logic (software) and data are stored in the main memory 1304 which may take the form of random access memory (RAM).

The system 1300 also includes input devices 1312, a graphics processor 1306, and a display 1308, i.e. a conventional CRT (cathode ray tube), LCD (liquid crystal display), LED (light emitting diode), plasma display or the like. User input may be received from the input devices 1312, e.g., keyboard, mouse, touchpad, microphone, and the like. In one embodiment, the graphics processor 1306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1300 may also include a secondary storage 1310. The secondary storage 1310 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1304 and/or the secondary storage 1310. Such computer programs, when executed, enable the system 1300 to perform various functions. The memory 1304, the storage 1310, and/or any other storage are possible examples of computer-readable media.

In one embodiment, the architecture and/or functionality of the various previous figures may be implemented in the context of the central processor 1301, the graphics processor 1306, an integrated circuit (not shown) that is capable of at least a portion of the capabilities of both the central processor 1301 and the graphics processor 1306, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1300 may take the form of a desktop computer, laptop computer, server, workstation, game consoles, embedded system, and/or any other type of logic. Still yet, the system 1300 may take the form of various other devices including, but not limited to a personal digital assistant (PDA) device, a mobile phone device, a television, etc.

Further, while not shown, the system 1300 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   generating a current frame of image data in a memory; and
   for each pixel in the current frame of image data:
   sampling a resolved pixel color for a corresponding pixel in a previous frame of image data stored in the memory;
   adjusting the resolved pixel color based on a statistical distribution of color values for a plurality of samples in the neighborhood of the pixel in the current frame of image data to generate an adjusted pixel color, comprising:
   calculating a mean color value based on the color values for a plurality of samples in the neighborhood of the pixel;
   calculating a variance for each color component based on the color values for the plurality of samples in the neighborhood of the pixel; and
   generating an axis-aligned bounding box (AABB) based on the mean color value and a standard deviation from the mean color value, wherein the standard deviation from the mean color value is calculated based on the variance, for each color component; and
   blending a color value for the pixel in the current frame of image data with the adjusted pixel color to generate a resolved pixel color for the pixel in the current frame of image data.

2. The method of claim 1, wherein generating the current frame of image data comprises:
   rendering geometry data to generate the current frame of image data; and
   adjusting at least one sample location for each pixel in the current frame of image data when compared to corresponding sample locations associated with the pixel in the previous frame of image data.

3. The method of claim 1, wherein sampling the resolved pixel color for the corresponding pixel in the previous frame of image data comprises:
   determining a motion vector corresponding to the pixel in the current frame of image data; and
   sampling the previous frame of image data based on the motion vector.

4. The method of claim 3, wherein sampling the previous frame of image data based on the motion vector comprises applying a bi-cubic filter to a plurality of color values corresponding to a plurality of pixels in the previous frame of image data.

5. The method of claim 1, wherein adjusting the resolved pixel color based on the statistical distribution of the plurality of samples in the neighborhood of the pixel comprises further comprises clipping the resolved pixel color to the AABB.

6. The method of claim 1, wherein adjusting the resolved pixel color based on the statistical distribution of the plurality of samples in the neighborhood of the pixel comprises further comprises clamping the resolved pixel color to the AABB.

7. The method of claim 1, wherein the current frame of image data is a composite image that comprises a plurality of layers.

8. A method, comprising:
   generating a current frame of image data in a memory, wherein the current frame of image data is a composite image that comprises a plurality of layers;
   determining a particular layer in the plurality of layers associated with a maximum relative difference in transmittance value; and
   for only those pixels in the current frame of image data on the particular layer:
   sampling a resolved pixel color for a corresponding pixel in a previous frame of image data stored in the memory;
   adjusting the resolved pixel color based on a statistical distribution of color values for a plurality of samples in the neighborhood of the pixel in the current frame of image data to generate an adjusted pixel color; and
   blending a color value for the pixel in the current frame of image data with the adjusted pixel color to generate a resolved pixel color for the pixel in the current frame of image data.

9. The method of claim 1, wherein the current frame of image data is a stereoscopic image that comprises a left image and a right image.

10. A method, comprising:
    generating a current frame of image data in a memory, wherein the current frame of image data is a stereoscopic image that comprises a left image and a right image;
    for each pixel in the current frame of image data:
    sampling a resolved pixel color for a corresponding pixel in a previous frame of image data stored in the memory;
    adjusting the resolved pixel color based on a statistical distribution of color values for a plurality of samples in the neighborhood of the pixel in the current frame of image data to generate an adjusted pixel color; and
    blending a color value for the pixel in the current frame of image data with the adjusted pixel color to generate a resolved pixel color for the pixel in the current frame of image data;
blending the resolved pixel color for pixels in the left image in the current frame of image data with sampled color values from a corresponding pixel in the right image in the current frame of image data; and
blending the resolved pixel color for pixels in the right image in the current frame of image data with sampled color values from a corresponding pixel in the left image in the current frame of image data.

11. A system, comprising:
a memory; and
a processor coupled to the memory and configured to:
  generate a current frame of image data in the memory; and
  for each pixel in the current frame of image data:
    sample a resolved pixel color for a corresponding pixel in a previous frame of image data stored in the memory;
    adjust the resolved pixel color based on a statistical distribution of color values for a plurality of samples in the neighborhood of the pixel in the current frame of image data to generate an adjusted pixel color, comprising:
      calculating a mean color value based on the color values for the plurality of samples in the neighborhood of the pixel;
      calculating a variance for each color component based on the color values for the plurality of samples in the neighborhood of the pixel;
      generating an axis-aligned bounding box (AABB) based on the mean color value and a standard deviation from the mean color value, wherein the standard deviation from the mean color value is calculated based on the variance, for each color component; and
    blend a color value for the pixel in the current frame of image data with the adjusted pixel color to generate a resolved pixel color for the pixel in the current frame of image data.

12. The system of claim 11, wherein generating the current frame of image data comprises:
  rendering geometry data to generate the current frame of image data; and
  adjusting at least one sample location for each pixel in the current frame of image data when compared to corresponding sample locations associated with the pixel in the previous frame of image data.

13. The system of claim 11, wherein sampling the resolved pixel color for the corresponding pixel in the previous frame of image data comprises:
  determining a motion vector corresponding to the pixel in the current frame of image data; and
  sampling the previous frame of image data based on the motion vector.

14. The system of claim 11, wherein adjusting the resolved pixel color based on the statistical distribution of the plurality of samples in the neighborhood of the pixel comprises further comprises clamping or clipping the resolved pixel color to the AABB.

15. A system, comprising:
a memory; and
a processor coupled to the memory and configured to:
  generate a current frame of image data in the memory, wherein the current frame of image data is a composite image that comprises a plurality of layers;
  determine a particular layer in the plurality of layers associated with a maximum relative difference in transmittance value; and
  for only those pixels in the current frame of image data on the particular layer:
    sample a resolved pixel color for a corresponding pixel in a previous frame of image data stored in the memory;
    adjust the resolved pixel color based on a statistical distribution of color values for a plurality of samples in the neighborhood of the pixel in the current frame of image data to generate an adjusted pixel color; and
    blend a color value for the pixel in the current frame of image data with the adjusted pixel color to generate a resolved pixel color for the pixel in the current frame of image data.

16. A system, comprising:
a memory; and
a processor coupled to the memory and configured to:
  generate a current frame of image data in the memory, wherein the current frame of image data is a stereoscopic image that comprises a left image and a right image;
  for each pixel in the current frame of image data:
    sample a resolved pixel color for a corresponding pixel in a previous frame of image data stored in the memory;
    adjust the resolved pixel color based on a statistical distribution of color values for a plurality of samples in the neighborhood of the pixel in the current frame of image data to generate an adjusted pixel color; and
    blend a color value for the pixel in the current frame of image data with the adjusted pixel color to generate a resolved pixel color for the pixel in the current frame of image data;
  blend the resolved pixel color for pixels in the left image in the current frame of image data with sampled color values from a corresponding pixel in the right image in the current frame of image data; and
  blend the resolved pixel color for pixels in the right image in the current frame of image data with sampled color values from a corresponding pixel in the left image in the current frame of image data.

17. The system of claim 11, wherein the processor is a parallel processing unit.

18. A non-transitory, computer-readable storage medium storing instructions that, when executed by a processor, cause the processor to perform steps comprising:
  generating a current frame of image data in a memory; and
  for each pixel in the current frame of image data:
    sampling a resolved pixel color for a corresponding pixel in a previous frame of image data stored in the memory;
    adjusting the resolved pixel color based on a statistical distribution of color values for a plurality of samples in the neighborhood of the pixel in the current frame of image data to generate an adjusted pixel color, comprising:
      calculating a mean color value based on the color values for a plurality of samples in the neighborhood of the pixel;

calculating a variance for each color component based on the color values for the plurality of samples in the neighborhood of the pixel; and generating an axis-aligned bounding box (AABB) based on the mean color value and a standard deviation from the mean color value, wherein the standard deviation from the mean color value is calculated based on the variance, for each color component; and blending a color value for the pixel in the current frame of image data with the adjusted pixel color to generate a resolved pixel color for the pixel in the current frame of image data.

\* \* \* \* \*